United States Patent
Niu et al.

(10) Patent No.: US 11,060,680 B2
(45) Date of Patent: Jul. 13, 2021

(54) LIGHTING DISPLAY DEVICE

(71) Applicant: HASCO VISION TECHNOLOGY CO., LTD., Shanghai (CN)

(72) Inventors: Lei Niu, Shanghai (CN); Juejing Yang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/964,601

(22) PCT Filed: Apr. 2, 2019

(86) PCT No.: PCT/CN2019/080975
§ 371 (c)(1),
(2) Date: Jul. 24, 2020

(87) PCT Pub. No.: WO2020/019751
PCT Pub. Date: Jan. 30, 2020

(65) Prior Publication Data
US 2021/0164631 A1    Jun. 3, 2021

(30) Foreign Application Priority Data

Jul. 25, 2018 (CN) .......................... 201810824226.1
Jul. 25, 2018 (CN) .......................... 201821180996.9

(51) Int. Cl.
| | |
|---|---|
| *F21S 41/153* | (2018.01) |
| *F21S 41/143* | (2018.01) |
| *F21S 41/43* | (2018.01) |
| *F21S 41/265* | (2018.01) |
| *F21S 41/20* | (2018.01) |
| *F21S 41/16* | (2018.01) |

(52) U.S. Cl.
CPC .......... *F21S 41/153* (2018.01); *F21S 41/143* (2018.01); *F21S 41/16* (2018.01); *F21S 41/265* (2018.01); *F21S 41/285* (2018.01); *F21S 41/43* (2018.01)

(58) Field of Classification Search
CPC ............... F21S 41/141–285; F21S 41/40–43
USPC ............ 362/97.1–97.4, 249.02, 311.02, 354, 362/538–539, 543–545
See application file for complete search history.

(56) References Cited

U.S. PATENT DOCUMENTS

| | | | | |
|---|---|---|---|---|
| 8,622,573 | B2 * | 1/2014 | Kubis .................... | H05B 45/56 362/231 |
| 2016/0265733 | A1 * | 9/2016 | Bauer .................. | F21S 41/275 |
| 2018/0073700 | A1 | 3/2018 | Orisich et al. | |

* cited by examiner

*Primary Examiner* — Jason M Han

(57) ABSTRACT

The present disclosure provides a lighting display device, including: a light source module, a light shield module, and a projection lens module; the light source module includes a light source array unit, a first light shield array unit, and a light receiving lens array unit; the light source array unit includes a plurality of light sources which are independently controlled, the first light shield array unit includes first light shields disposed outside each light source, the light receiving lens array unit includes a plurality of light receiving lenses; the light shield module includes a light-transmitting substrate having a plurality of light-transmitting parts, a light-shielding pattern is disposed on the light-transmitting parts; the projection lens module includes a second light shield array unit, and a projection lens array unit; the second light shield array unit contains multiple second light shields, the projection lens array unit contains multiple projection lenses.

15 Claims, 11 Drawing Sheets

LIGHTING DISPLAY DEVICE

CROSS REFERENCES TO RELATED APPLICATIONS

This is a Sect. 371 National Stage of PCT International Application No. PCT/CN2019/080975, filed on 2 Apr. 2019, which claims priority of a Chinese Patent Application No. 2018108242261 filed on 25 Jul. 2018 and a Chinese Patent Application No. 2018211809969 filed on 25 Jul. 2018, the contents of the three applications hereby being incorporated by reference in their entireties for all purposes.

BACKGROUND OF THE PRESENT DISCLOSURE

Field of Disclosure

The disclosure relates to a lighting device for a vehicle, in particular, to a lighting display device.

Description of Related Arts

With the development of the automobile industry and the traffic situation becoming more and more complex, traffic participants not only have a demand for safe and comfortable lighting, but also have a higher demand for human-car interaction and human-human interaction. The daytime driving lights, turning lights, taillights, brake lights, high beam lights, low beam lights, and other conventional external lights of automobiles cannot meet the demand. In the future, with the gradual escalation of the auxiliary driving system and automatic driving system, drivers or vehicles need to interact with more participants on the road.

With the traffic situation becoming more and more complex, the lighting system which only provides intelligent pixelate cannot satisfy the information exchange and communication between drivers and pedestrians, cars and cars, drivers and drivers, and among other multiple traffic participants.

SUMMARY OF THE PRESENT DISCLOSURE

The present disclosure provides a lighting display device which can realize both matrix pixelated lighting and matrix pixelated display.

The present disclosure provides a lighting display device, including: a light source module, a light shield module, and a projection lens module arranged successively along an optical axis direction, where the light source module includes a light source array unit, a first light shield array unit, and a light receiving lens array unit arranged successively along the optical axis direction, where the light source array unit includes a plurality of light sources which are independently controlled and arranged in a matrix, the first light shield array unit includes a plurality of first light shields arranged in a matrix and disposed outside each light source, and the light receiving lens array unit includes a plurality of light receiving lenses arranged in a matrix and disposed opposite to each light source along the optical axis direction; the light shield module includes a light-transmitting substrate having a plurality of light-transmitting parts arranged in a matrix and disposed opposite to each light receiving lens along the optical axis direction, and a light-shielding pattern is disposed on at least two light-transmitting parts in the plurality of light-transmitting parts; and the projection lens module includes a second light shield array unit, and a projection lens array unit arranged successively along the optical axis direction, where the second light shield array unit contains a plurality of second light shields arranged in a matrix and disposed outside each light-transmitting part, and the projection lens array unit contains a plurality of projection lenses arranged in a matrix and disposed opposite to each light-transmitting part along the optical axis direction.

Further, the light source includes a semiconductor light source; or a semiconductor laser and an optical conversion element; or a solid-state laser and the optical conversion element.

Further, the light receiving lens includes a Fresnel lens.

Further, the first light shield array unit and the light receiving lens array unit are molded or injection molded into one piece.

Further, a material of the light receiving lens array unit includes silicone, PC, PMMA, or glass.

Further, the first light shield array unit is made of a non-transparent material.

Further, the first light shield array unit includes a base body made of a transparent material, and a light blocking layer made of black paint sprayed on a surface of the base body.

Further, the light-shielding pattern includes a cut-off line pattern, an inflection point pattern, and a high beam pattern; and one type of the light-shielding pattern is arranged on one light-transmitting part.

Further, the light-shielding pattern is formed on the light-transmitting part by coating film or laser engraving.

Further, a material of the light-transmitting substrate includes PC, PMMA, or glass.

Further, the second light shield array unit is made of a non-transparent material.

Further, the second light shield array unit includes a base body made of a transparent material, and a light blocking layer made of black paint sprayed on a surface of the base body.

Further, the second light shield array unit and the projection lens array unit are molded or injection molded into one piece.

Further, the projection lens includes a Fresnel lens.

Further, a material of the projection lens array unit includes silicone, PC, PMMA, or glass.

As stated above, the lighting display device of the present disclosure has the following beneficial effects:

In the preset disclosure, by independently controlling the brightness of multiple light sources, the brightness modulation of multiple light beams can be realized in the projection space. Images with different brightness and darkness can be observed from the direction facing the projection lens module, to realize matrix pixelate display. At the same time, with several light-shielding patterns in the light shield module, different lighting patterns can be observed from the direction facing away from the projection lens module, to realize matrix pixelate lighting, so as to satisfy the safe and comfortable lighting, as well as the information communication between people and vehicles, vehicles and vehicles, and people and people.

Figure 1:
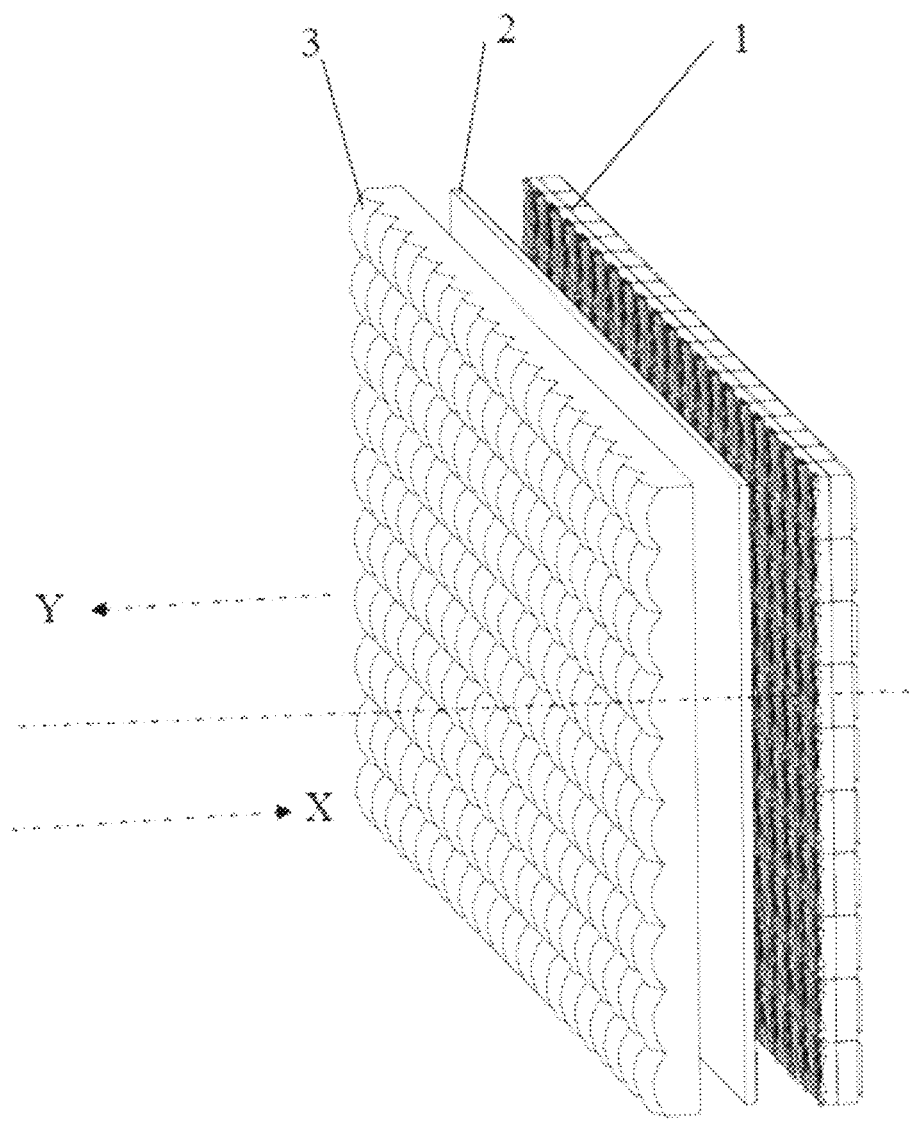
FIG. 1 is a schematic structural diagram of the lighting display device in the present disclosure.

| Description of component mark numbers: | |
|---|---|
| 1 | Light source module |
| 11 | Light source array unit |
| 111 | Light source |
| 12 | First light shield array unit |
| 121 | First light shield |
| 13 | Light receiving lens array unit |
| 131 | Light receiving lens |
| 2 | Light shield module |
| 21 | Light-transmitting part |
| 22 | Light-shielding pattern |
| 221 | Cut-off line pattern |
| 222 | Inflection point pattern |
| 223 | High beam pattern |
| 3 | Projection lens module |
| 31 | Second light shield array unit |
| 311 | Second light shield |
| 32 | Projection lens array unit |
| 321 | Projection lenses |
| 4 | Projection space |

DETAILED DESCRIPTION OF THE PREFERRED EMBODIMENTS

The implementation mode of the present disclosure will be described below through specific embodiments. Those skilled in the art can easily understand other advantages and effects of the present disclosure according to contents disclosed by the specification.

It should be noted that the structures, proportions, sizes, etc. illustrated in the drawings attached to this specification are only used to match the contents disclosed in the specification so that those skilled in the art can understand and read them. They are not used to limit the conditions under which the disclosure can be implemented. Therefore, they are not of technical significance, and any modifications of the structure, changes of the proportional relation or adjustments of size shall remain within the scope of the technical content disclosed by the present disclosure, without affecting the efficacy and purpose achieved by the present disclosure. At the same time, the terms such as "up", "down", "left", "right", "middle" and "one" quoted in this specification are only for the convenience of clear description, not for the purpose of limiting the enforceable scope of implementation of the present disclosure, and the change or adjustment of its relative relationship shall also be regarded as being within the enforceable scope of the present disclosure without substantial changes in the technical content.

The matrix or digital adaptive headlamp for a vehicle is a kind of pixelated lighting system which adopts the concept of matrix and can independently control the brightness of multiple light sources. When the vehicle equipped with the lighting system detects that other participants on the road are in a certain pixel interval of the headlamp lighting, the lighting system intelligently adjusts the lighting brightness of the pixel interval to avoid dangerous dazzling to the illuminated people, while maintaining high brightness in the space without other participants on the road. With such technical support, we can not only ensure high quality lighting in front of us (with matrix or digital adaptive headlamps), but also avoid dangerous dazzling to other participants on the road (such as vehicles traveling in the opposite direction or in the same direction, etc.), thus ensuring the safety of night driving of all parties on the road.

In the following embodiments, the optical axis direction of the lighting display device is defined as a forward direction, therefore, the projection emergent direction Y of the lighting display device is also defined as the forward direction.

The present disclosure provides a lighting display device, which is mainly used for a vehicle and, of course, can also be used in other fields. The preferred embodiment of the lighting display device used for a vehicle is described as follows.

Figure 2:
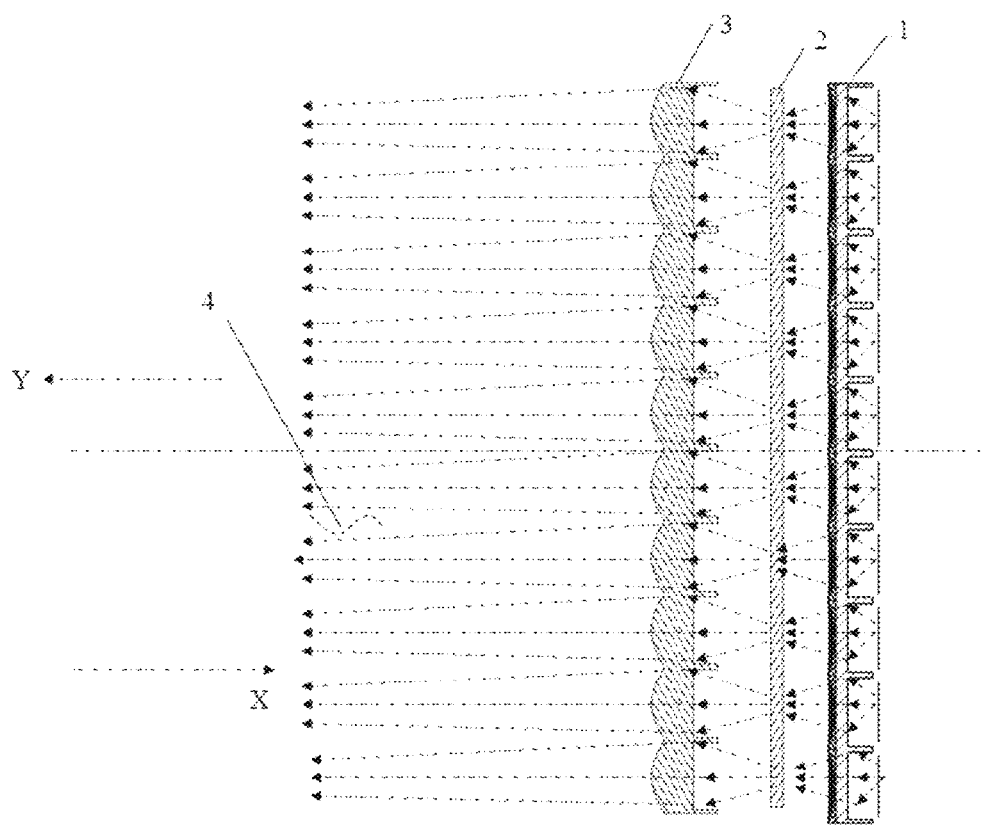
FIG. 2 is an optical principle diagram of the lighting display device in the present disclosure.
Figure 3:
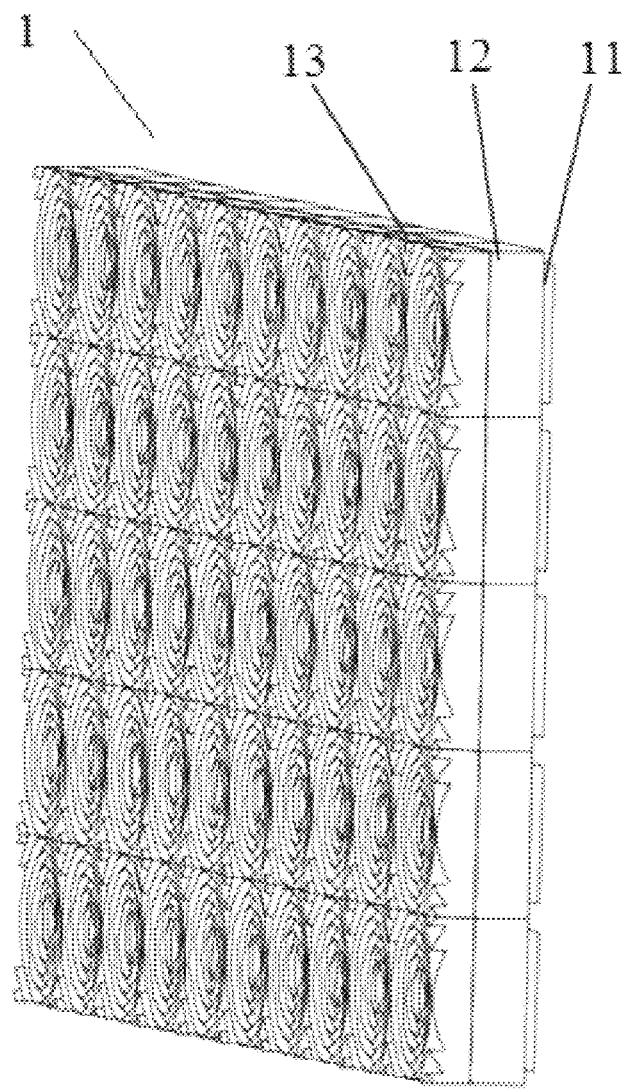
FIG. 3 is a schematic structural diagram of the first embodiment of the light source module in the present disclosure.
Figure 4:
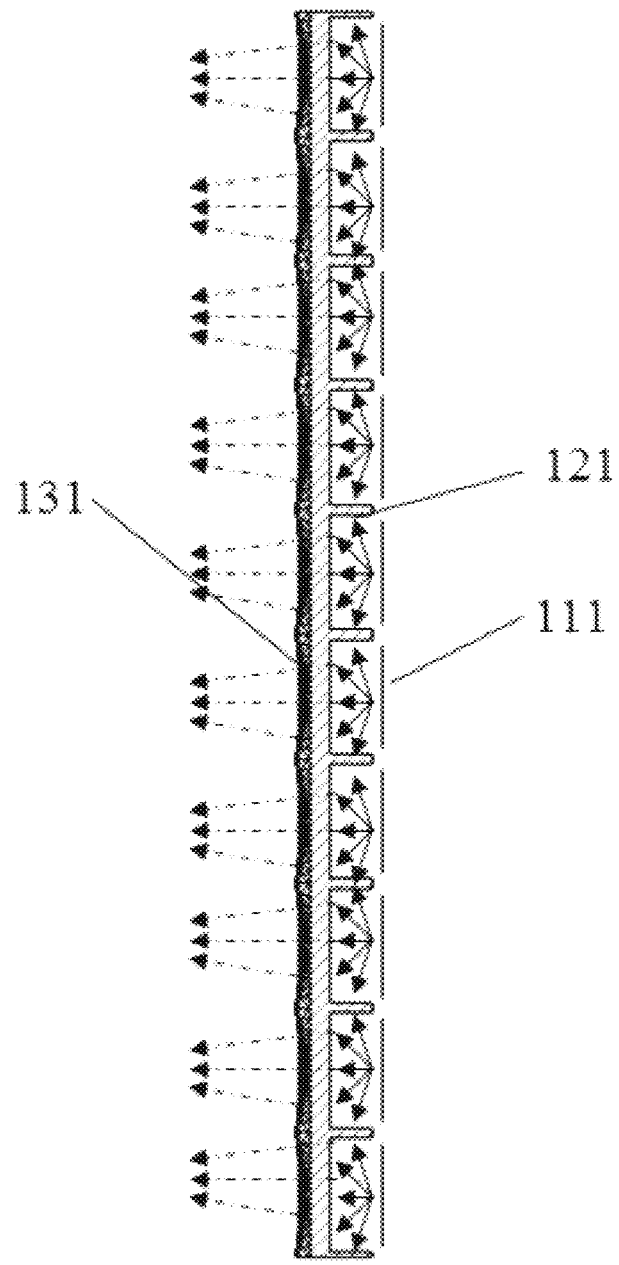
FIG. 4 is an optical principle diagram of the first embodiment of the light source module in FIG. 3.

As shown in FIGS. 1 and 2, the lighting display device includes a light source module 1, a light shield module 2 and a projection lens module 3 arranged from the back to the front successively along the optical axis direction. As shown in FIGS. 3 and 4, the light source module 1 includes a light source array unit 11, a first light shield array unit 12 and a light receiving lens array unit 13 arranged from the back to the front successively along the optical axis direction; the light source array unit 11 contains a plurality of light sources 111 which are independently controlled and arranged in a matrix. The first light shield array unit 12 contains a plurality of first light shields 121 arranged in a matrix and disposed outside each light source 111. The light receiving lens array unit 13 contains a plurality of light receiving lenses 131 arranged in a matrix and disposed opposite to each light source 111 along the optical axis direction.

Figure 8:
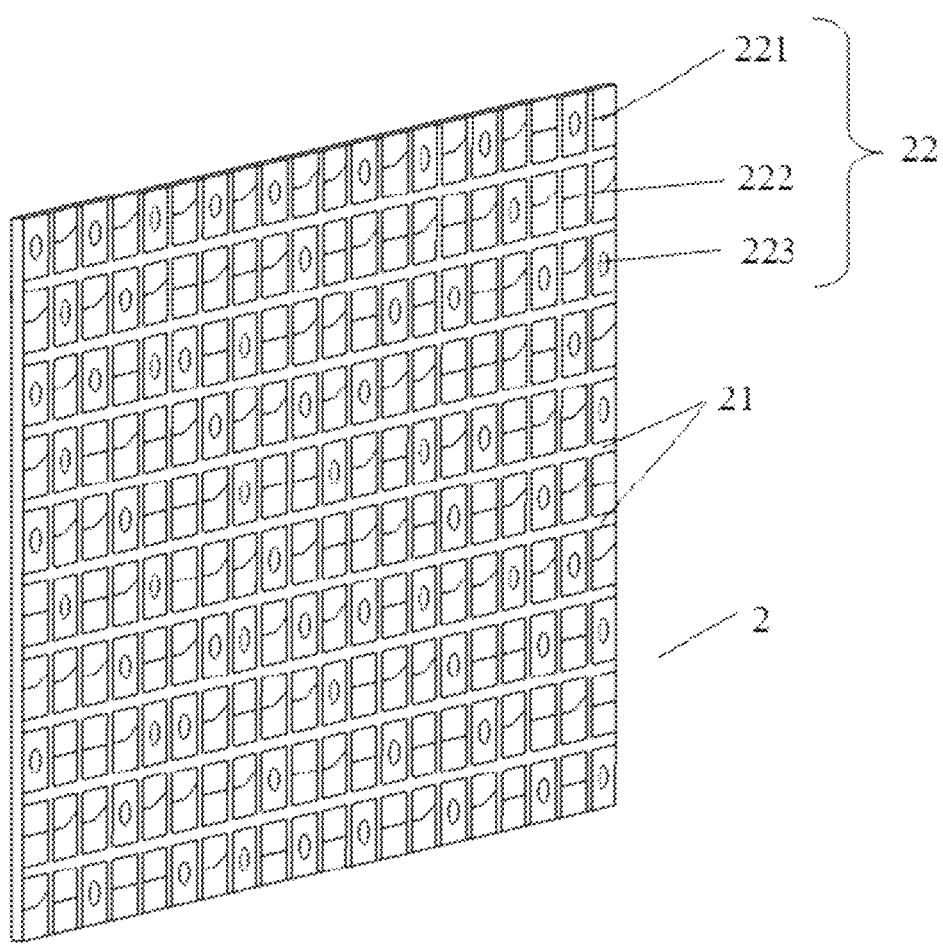
FIG. 8 is a schematic structural diagram of the light shield module in the present disclosure.
Figure 9:
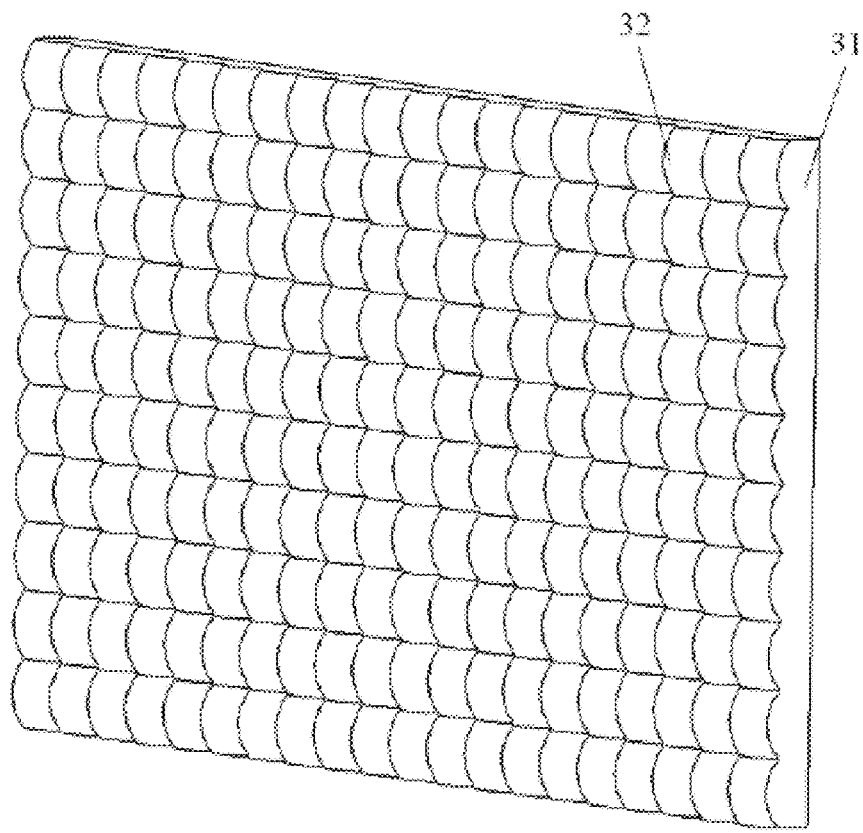
FIGS. 9 and 10 are schematic structural diagrams of the projection lens module in the present disclosure from different angles of view.
Figure 10:
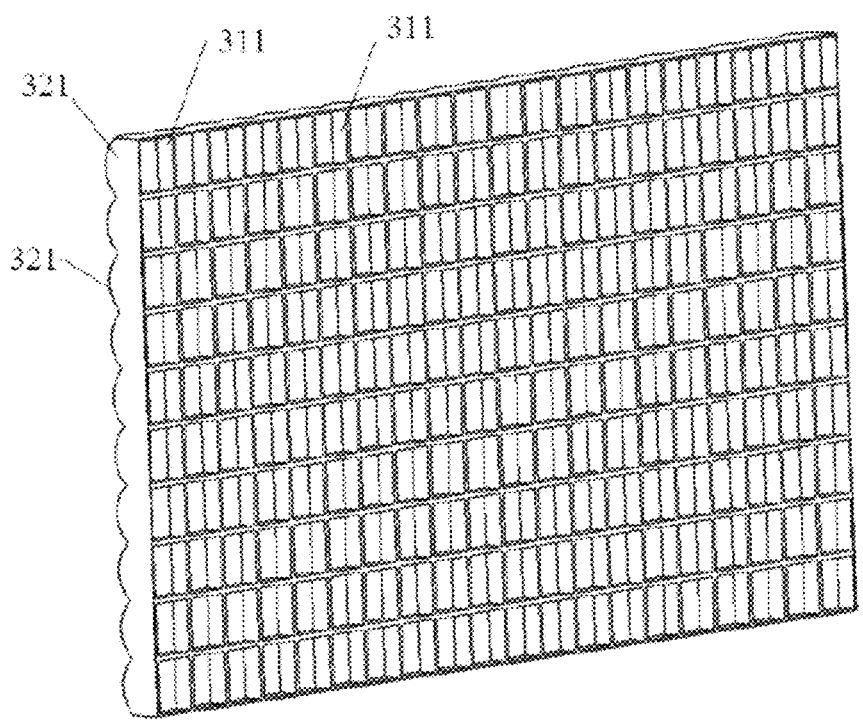

As shown in FIG. 8, the light shield module 2 includes a light-transmitting substrate, which contains a plurality of light-transmitting parts 21 arranged in a matrix and disposed opposite to each light receiving lens 131 along the optical axis direction. A light-shielding pattern 22 is arranged on at least several light-transmitting parts 21 in the plurality of light-transmitting parts 21. In the present disclosure, a light-shielding pattern 22 is arranged on each light-transmitting part 21. As shown in FIGS. 9 and 10, the projection lens module 3 includes a second light shield array unit 31 and a projection lens array unit 32 arranged from the back to the front successively along the optical axis. The second light shield array unit 31 contains a plurality of second light shields 311 arranged in a matrix and disposed outside each light-transmitting part 21. The projection lens array unit 32 contains a plurality of projection lenses 321 arranged in a matrix and disposed opposite to each light-transmitting part 21 along the optical axis direction. Therefore, in the above-mentioned lighting display device for a vehicle, the light source 111, the light receiving lens 131, the light-transmitting part 21, the light-shielding pattern 22 on the light-transmitting part 21 and the projection lens 321 are arranged in one-to-one correspondence along the optical axis direction.

Figure 11:
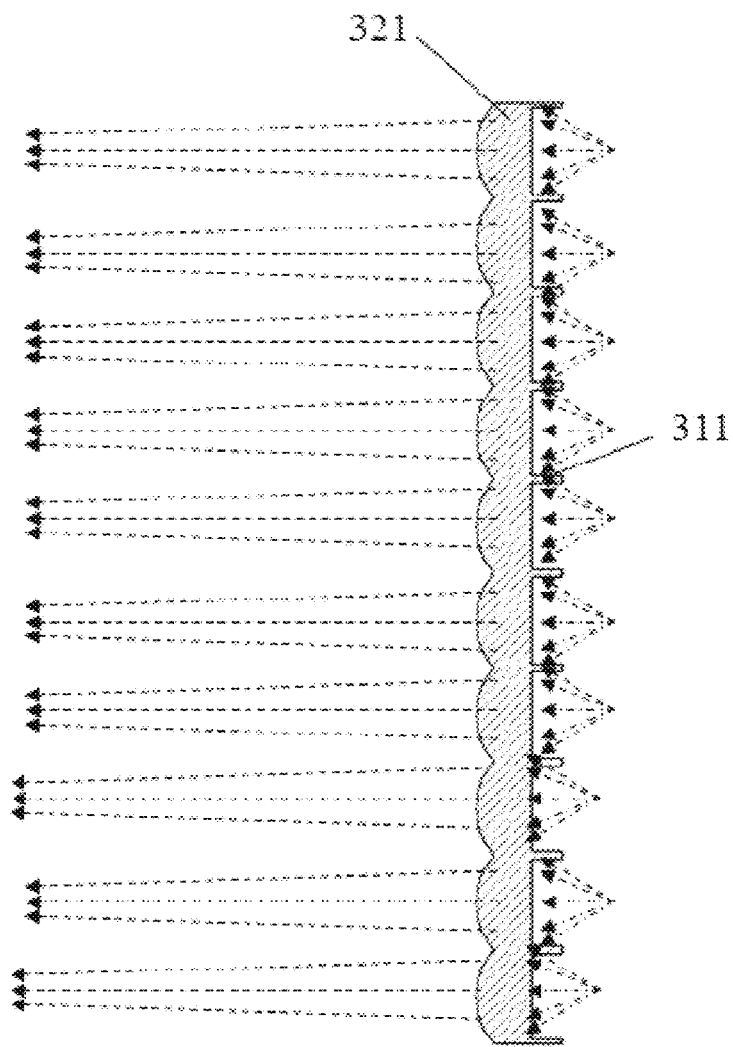
FIG. 11 is an optical principle diagram of the projection lens module in the present disclosure.

The working principle of the above-mentioned lighting display device for a vehicle is as follows: as shown in FIGS. 1 and 2, the light source module 1 is a matrix light source module 1. Multiple light sources 111 which can control the switch separately emit independent light beams. The light beams spread along the projection emergent direction Y of the lighting display device, most of the divergent light beams emitted by the light source 111 are refracted by the light receiving lens 131 in the light receiving lens array unit 13, the light receiving lens 131 is disposed in one-to-one correspondence with the light source 111. After changing the angle and the aperture, the light beam continues to spread along the optical axis direction, and the light beam with a large angle emitted by the light source 111 is blocked by the first light shield 121 located outside the light source 111. Therefore, the light beam with a large angle will not continue to spread along the optical axis, as shown in FIG. 4, and will not interfere with light beams emitted by other light sources 111 in the light source array unit 11. The light beam emitted by the light source module 1 is refracted by the light-transmitting part 21 in the light shield module 2 and the projection lens 321 in the projection lens module 3, and different light distributions and patterns are projected in the projection space 4 in front of the lighting display device. In addition, after the light beam emitted by the light source 111 is refracted by the corresponding light receiving lens 131 and the light-transmitting part 21, a light beam with a large angle may appear. The light beam with a large angle will be occluded by the second shield 311 located outside the light-transmitting part 21, as shown in FIG. 11, therefore, the light beams refracted by adjacent light-transmitting parts 21 will not influence and interfere with each other.

Figure 12:
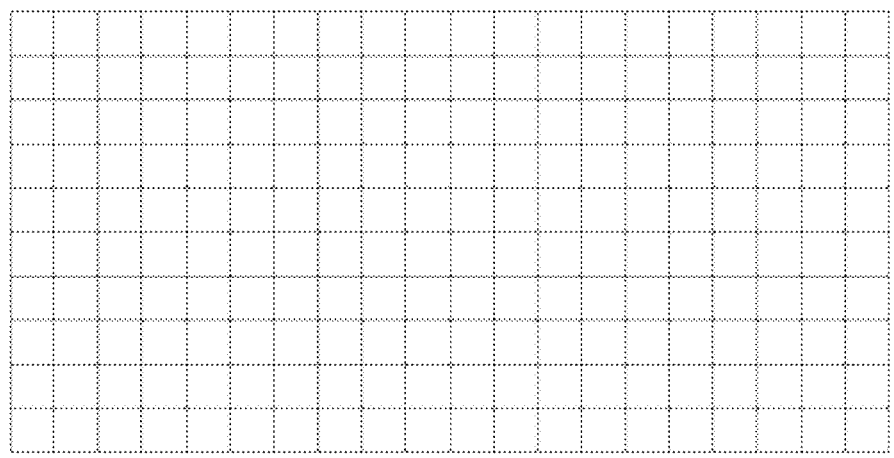
FIGS. 12 to 14 show different display images of the lighting display device observed from the direction facing the projection lens module.
Figure 13:
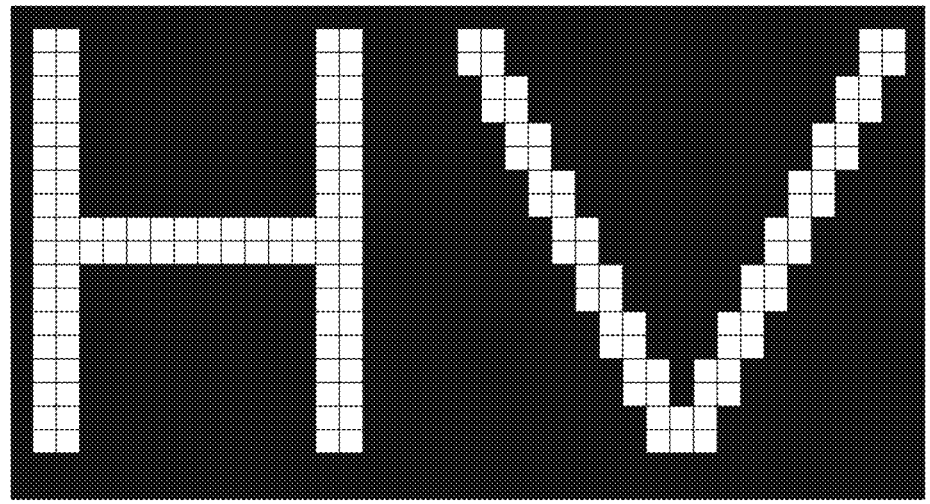
Figure 14:
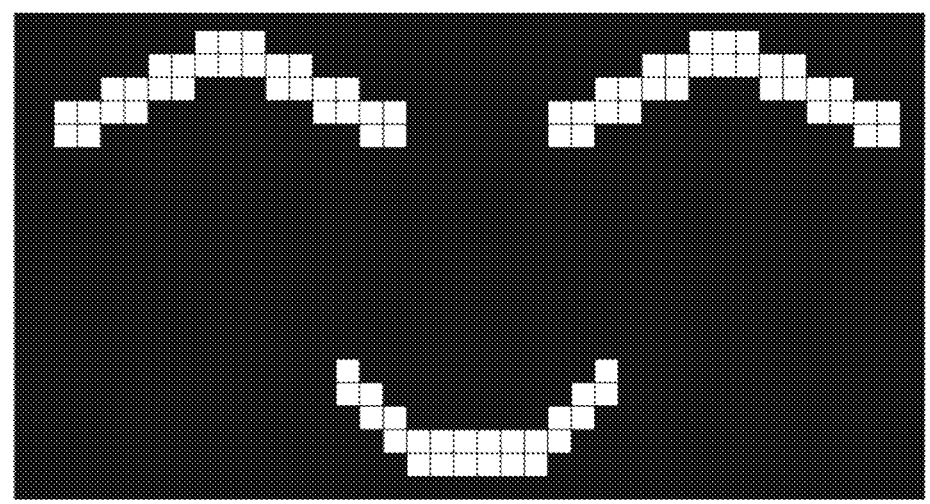

In the above-mentioned lighting display device for a vehicle, from the observer's direction X which observes the lighting display device for a vehicle, such as the driver's observation direction of the opposite running direction, the observation direction of other road participants, and the direction facing the projection lens module 3, by independently controlling the brightness of multiple light sources 111, the brightness modulation of multiple light beams can be realized in the projection space 4, thus displaying different light distributions in the projection space 4. Observers can observe images with different brightness and darkness displayed by the lighting display device. For example, when multiple light sources 111 are controlled to be fully illuminated, the lighting display device for a vehicle can be observed to be fully bright in the direction facing the projection lens module 3, as shown in FIG. 12; for another example, when controlling part of the light sources 111 to be bright and part dark, the lighting display device for a vehicle can be observed in the direction facing the projection lens module 3 to display the "HV" letter image as shown in FIG. 13 or the "smiling face" image as shown in FIG. 14, thus realizing matrix pixelate display.

At the same time, in the above-mentioned lighting display device for a vehicle, the lighting display device for a vehicle is observed from the projection emergent direction Y, such as the direction of the driver of the vehicle, and the direction facing away from the projection lens module 3. The light beams emitted by the multiple light sources 111 which control the brightness separately are refracted by the corresponding light receiving lens 131, the light-transmitting part 21, the light-shielding pattern 22 on the light-transmitting part 21 and the projection lens 321, different lighting patterns will be projected in the projection space 4 due to the effect of the light-shielding pattern 22 on the light-transmitting part 21. Therefore, by independently controlling the brightness of multiple light sources 111 in combination with the light-shielding pattern 22 on the light-transmitting part 21, the driver of the vehicle can see that the lighting display device projects different lighting patterns, thus realizing the matrix pixelate lighting.

In addition, when illuminating drivers or other road participants of vehicles running in an opposite direction using the lighting display device, the dangerous dazzling to drivers or other road participants of vehicles running in the opposite direction can be avoided by independently controlling the brightness of multiple light sources 111, which makes the matrix pixelate lighting of the lighting display device for a vehicle have the function of shielding; of course, by independently controlling the brightness of multiple light sources 111, people can also be highlighted. Therefore, the present disclosure realizes matrix pixelate display, matrix pixelate lighting, and the shielding or highlighting of matrix pixelate lighting, so as to meet the requirements of safe and comfortable lighting, and information communication between people and vehicles, vehicles and vehicles, and people and people.

Figure 5:
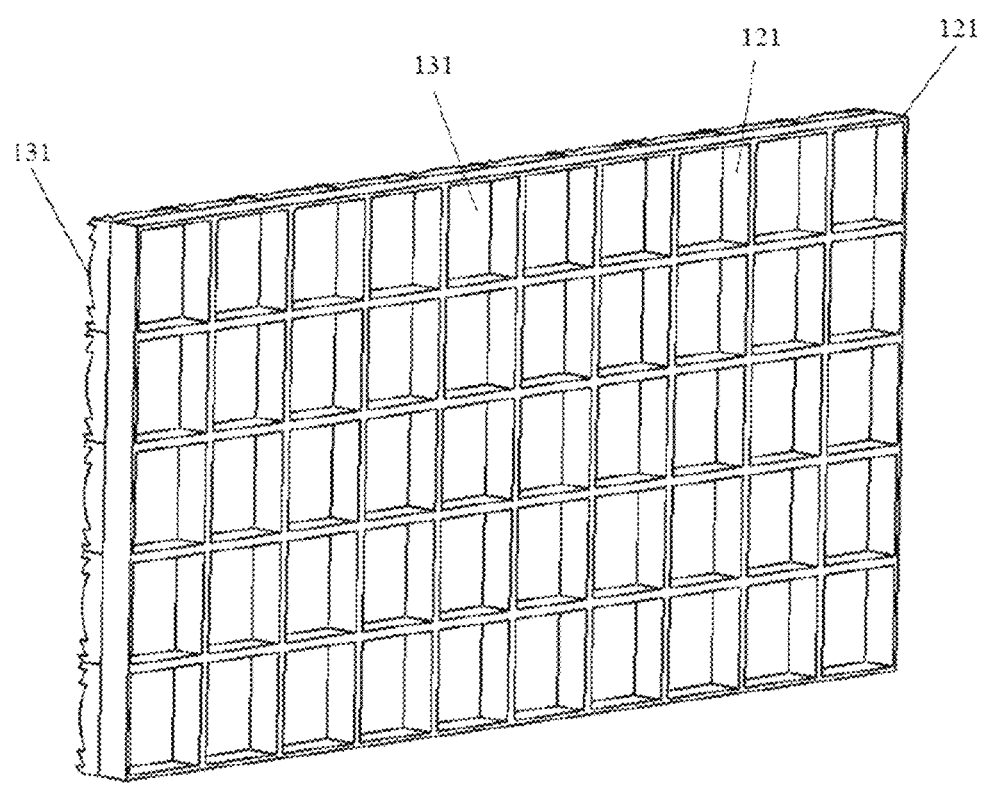
FIG. 5 is a schematic connection diagram of the first light shield array unit and the light receiving lens array unit of the first embodiment of the light source module in FIG. 3.

Preferably, for the light source module 1, the light source 111, the first light shield 121 located outside the light source 111, and the light receiving lens 131 directly opposite to the light source 111 correspond to each other. The light source 111 can be selected from one of the following types: a semiconductor light source, or a light source including a semiconductor laser and an optical conversion element, or a light source including a solid-state laser and an optical conversion element, the optical conversion element can be made of an optical conversion material. The first light shield 121 is a frame structure, as shown in FIG. 5, each first light shield 121 has four ribs, and two adjacent first light shields 121 can share one rib. The first light shield array unit 12 is made of a non-transparent material; of course, the first light shield array unit 12 includes a base body made of a transparent material and a light blocking layer made of black paint sprayed on the surface of the base body.

Figure 6:
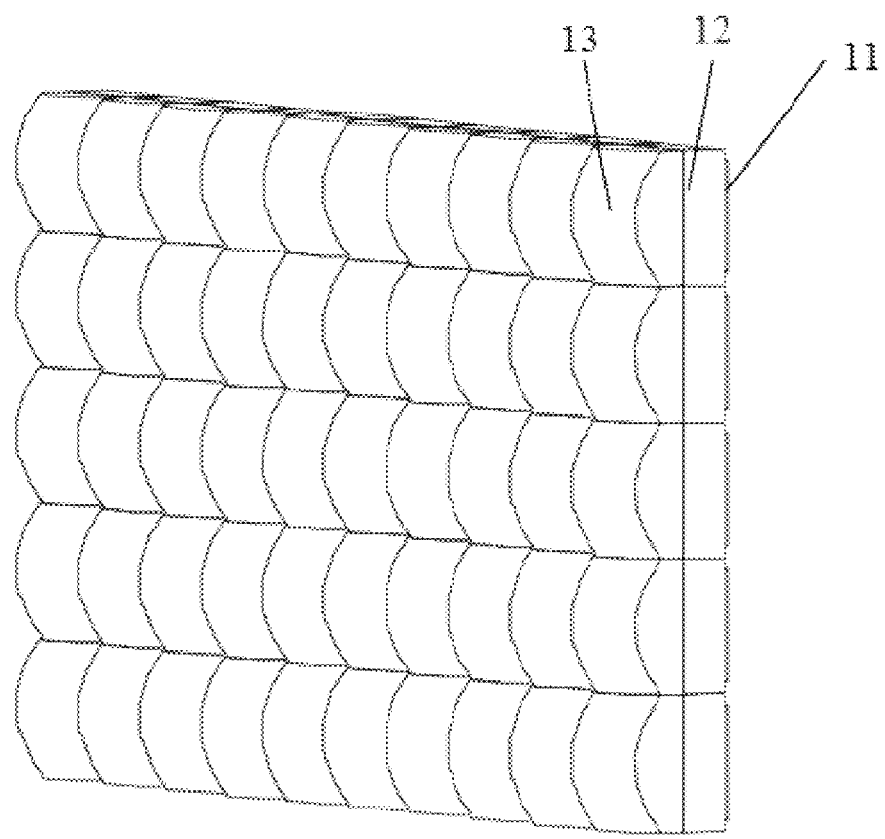
FIG. 6 is a schematic structural diagram of the second embodiment of the light source module in the present disclosure.
Figure 7:
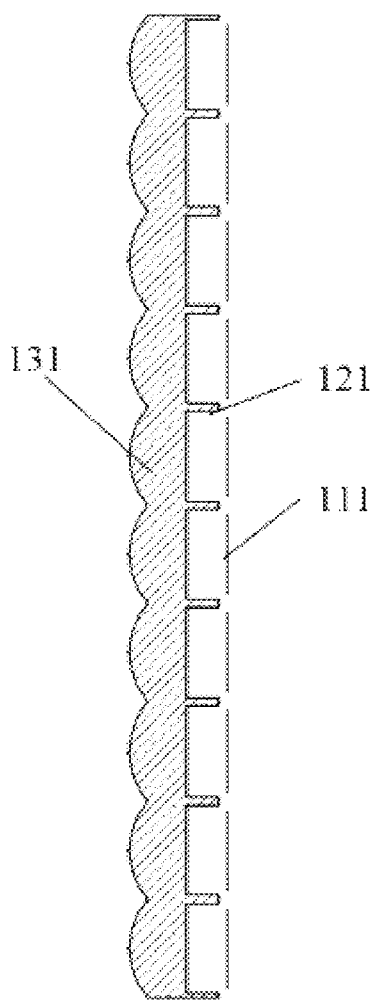
FIG. 7 is a sectional view of the second embodiment of the light source module in FIG. 6.

The first light shield array unit 12 composed of multiple first light shields 121 is an integral part, and the light receiving lens array unit 13 composed of multiple light receiving lenses 131 is also an integral part. The light receiving lens array unit 13 can be fixed with an additional bracket or directly fixed to the first light shield array unit 12; when the light receiving lens array unit 13 is directly fixed to the first light shield array unit 12, the first light shield array unit 12 and the light receiving lens array unit 13 are molded or injection molded into one piece, to reduce the volume of the lighting display device. Of course, the first light shield array unit 12 and the light receiving lens array unit 13 can also be two independent parts. As shown in FIGS. 3 and 4, each light receiving lens 131 is a Fresnel lens; or, as shown in FIGS. 6 and 7, each light receiving lens 131 is a conventional lens. The material of the light receiving lens array unit 13 is transparent material such as silicone, PC, PMMA, or glass. The surface of the light receiving lens array unit 13 can be smooth mirror surface or rough structure surface.

Preferably, for the light shield module 2, as shown in FIG. 8, the light shield module 2 is a plate structure with a light-shielding pattern 22 on each light-transmitting part 21. The light-shielding pattern 22 contains many types, such as a cut-off line pattern 221, an inflection point pattern 222, and a high beam pattern 223. According to the actual needs of the type, the cut-off line pattern 221, the inflection point pattern 222 and the high beam pattern 223 can be arranged according to certain rules, of course, other types of the light-shielding pattern 22 can also be added. One type of the light-shielding pattern 22 is disposed on one light-transmitting part 21. The material of the light-transmitting substrate includes PC, PMMA, glass, or the like. The light-shielding pattern 22 is formed on the light-transmitting part 21 by coating film or laser engraving, so that the light-shielding pattern 22 can be attached to the light-transmitting substrate.

Preferably, for the projection lens module 3, the structure of the second light shield 311 is similar to that of the first light shield 121, which is also the frame structure. As shown in FIG. 10, each second light shield 311 includes four ribs, and two adjacent second light shields 311 can share one rib. The second light shield array unit 31 is made of a non-transparent material. The second light shield array unit 31 includes a base body made of a transparent material and a light blocking layer made of black paint sprayed on the surface of the base body. The second light shield array unit 31 consisting of multiple second light shields 311 is an integral part, and the projection lens array unit 32 consisting of multiple projection lenses 321 is also an integral part. The projection lens array unit 32 can be fixed using an additional bracket or directly fixed to the second light shield array unit 31. When the projection lens array unit 32 is directly fixed to the second light shield array unit 31, the second light shield array unit 31 and the projection lens array unit 32 are molded or injection molded into one piece, to reduce the volume of the lighting display device. Of course, the second light shield array unit 31 and the projection lens array unit 32 can also be two independent parts. Each projection lens 321 is a Fresnel lens; or, as shown in FIG. 11, each projection lens 321 is a conventional lens. The material of the projection lens array unit 32 is a transparent material such as silicone, PC, PMMA, glass, or the like. The surface of the projection lens array unit 32 can be smooth mirror surface or rough structure surface.

In summary, in the lighting display device for a vehicle in the present disclosure, each light source 111 in the light source module 1, each light receiving lens 131 in the light source module 1, each first light shield 121 in the light source module 1, each light-transmitting part 21 with a light-shielding pattern 22 in the light shield module 2, each projection lens 321 in the projection lens module 3, and each second light shield 311 in the projection lens module 3 correspond to each other, forming an independent optical small system. The lighting display device for a vehicle consists of several optical small systems arranged in a matrix. The light beams move along the projection emergent direction Y in each optical small system, forming independent projection light beams in the projection space 4. The combination of different brightness of several optical small systems forms the lighting pattern needed by the lighting display device for a vehicle in the projection space 4. At the same time, the brightness characteristics of each optical small system can be seen from the observer's direction X, and various symbols and patterns displayed by the lighting display device for a vehicle can also be observed, thus meeting the requirements of safe and comfortable lighting, and information communication between people and vehicles, vehicles and vehicles, and people and people. Therefore, the lighting display device for a vehicle of the present disclosure has the following advantages:

1. Controlling the brightness of each light source 111 can not only realize the matrix pixelate display of symbols and patterns, but also realize the matrix pixelate lighting and interaction with traffic participants in visual information, and realize the brightness modulation of multiple light beams in the projection space, so as to avoid dangerous dazzling and complete the handling of the occlusion of multiple targets.

2. It can realize the functions of low beam, high beam and other vehicle lights, and effectively improve the energy utilization rate of the light source.

3. The structure is simple, the traditional optical structure such as a light guide rod is omitted, thereby reducing the volume itself, and reducing the processing cost and assembly difficulty.

4. The stray light is shielded by the first light shield 121 and the second light shield 311, so that the light beams of multiple optical small systems do not interfere with each other, and the light distribution is uniform.

Therefore, the present disclosure effectively overcomes various shortcomings of the traditional technology and has high industrial utilization value.

The above-mentioned embodiments are just used for exemplarily describing the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the claims of the present disclosure.

What is claimed is:

1. A lighting display device, comprising a light source module (1), a light shield module (2), and a projection lens module (3) arranged successively along an optical axis direction, wherein the light source module (1) comprises a light source array unit (11), a first light shield array unit (12), and a light receiving lens array unit (13) arranged successively along the optical axis direction, wherein the light source array unit (11) comprises a plurality of light sources (111) which are independently controlled and arranged in a matrix, the first light shield array unit (12) comprises a plurality of first light shields (121) arranged in a matrix and disposed outside each light source (111), and the light receiving lens array unit (13) comprises a plurality of light receiving lenses (131) arranged in a matrix and disposed opposite to each light source (111) along the optical axis direction;

the light shield module (2) comprises a light-transmitting substrate having a plurality of light-transmitting parts (21) arranged in a matrix and disposed opposite to each light receiving lens (131) along the optical axis direction, and a light-shielding pattern (22) is disposed on at least two light-transmitting parts (21) in the plurality of light-transmitting parts (21); and the projection lens module (3) comprises a second light shield array unit (31), and a projection lens array unit (32) arranged successively along the optical axis direction, wherein the second light shield array unit (31) contains a plurality of second light shields (311) arranged in a matrix and disposed outside each light-transmitting part (21), and the projection lens array unit (32) contains a plurality of projection lenses (321) arranged in a matrix and disposed opposite to each light-transmitting part (21) along the optical axis direction.

2. A lighting display device according to claim 1, wherein the light source (111) comprises
a semiconductor light source; or
a semiconductor laser and an optical conversion element; or
a solid-state laser and the optical conversion element.

3. A lighting display device according to claim 1, wherein the light receiving lens (131) includes a Fresnel lens.

4. A lighting display device according to claim 1, wherein the first light shield array unit (12) and the light receiving lens array unit (13) are molded or injection molded into one piece.

5. A lighting display device according to claim 1, wherein a material of the light receiving lens array unit (13) includes silicone, PC, PMMA, or glass.

6. A lighting display device according to claim 1, wherein the first light shield array unit (12) is made of a non-transparent material.

7. A lighting display device according to claim 1, wherein the first light shield array unit (12) comprises
a base body made of a transparent material, and
a light blocking layer made of black paint sprayed on a surface of the base body.

8. A lighting display device according to claim 1, wherein the light-shielding pattern (22) includes
a cut-off line pattern (221),
an inflection point pattern (222), and
a high beam pattern (223); and
one type of the light-shielding pattern (22) is arranged on one light-transmitting part (21).

9. A lighting display device according to claim 1, wherein the light-shielding pattern (22) is formed on the light-transmitting part (21) by coating film or laser engraving.

10. A lighting display device according to claim 1, wherein a material of the light-transmitting substrate includes PC, PMMA, or glass.

11. A lighting display device according to claim 1, wherein the second light shield array unit (31) is made of a non-transparent material.

12. A lighting display device according to claim 1, wherein the second light shield array unit (31) comprises
a base body made of a transparent material, and
a light blocking layer made of black paint sprayed on a surface of the base body.

13. A lighting display device according to claim 1, wherein the second light shield array unit (31) and the projection lens array unit (32) are molded or injection molded into one piece.

14. A lighting display device according to claim 1, wherein the projection lens (321) includes a Fresnel lens.

15. A lighting display device according to claim 1, wherein a material of the projection lens array unit (32) includes silicone, PC, PMMA, or glass.

* * * * *